3,388,081
HYDROPHILIC POLYURETHANE FOAM
Rudolf Merten, Leverkusen, and Günther Braun, Cologne, Germany, assignors to Farbenfabriken Bayer Aktiengesellschaft, Leverkusen, Germany, a corporation of Germany
No Drawing. Continuation-in-part of application Ser. No. 137,722, Sept. 13, 1961. This application June 10, 1966, Ser. No. 556,541
Claims priority, application Germany, Oct. 13, 1960, F 32,331
6 Claims. (Cl. 260—2.5)

ABSTRACT OF THE DISCLOSURE

Making a polyurethane foam hydrophilic by incorporation in the foamable composition from which the polyurethane is produced a hydrolyzable ester derived from monohydric or polyhydric alcohols and the hydrated oxides of boron, aluminum, and silicon in which only one of the hydroxyl groups of the polyhydric alcohol is esterified.

---

This invention relates generally to polyurethanes and more particularly to an improved polyurethane having improved hydrophilic propetries. The application is a continuation-in-part of application Ser. No. 137,722, filed Sept. 13, 1961, now abandoned.

Polyurethane foams are prepared by a process in which a resinous organic compound having reactive hydrogen atoms is reacted with an organic polyisocyanate in a reaction medium containing a gas. Ordinarily, water-insoluble reactants are used in order that the resulting polyurethane will be hydrophobic. Polyurethane foams are used extensively in upholstering furniture and seats of vehicles and for these purposes it is desirable to have a hydrophobic material. However, because of the low water absorption capacity of such polyurethane foams, sponges made from them are not as good as sponges made of some other cellular plastic material or from cellulose. The hydrophobic polyurethane foam absorbs water only by replacement of air in the pores while a natural sponge or one made from cellulose is wet by water and holds water in addition to that entrapped in its pores.

It has been proposed as a solution to the problem that polyurethane foams should be prepared using a polyethylene glycol as the resinous component since polyurethanes prepared with such resins are hydrophilic in nature. However, cellular polyurethanes thus prepared are not entirely suitable for making sponges and similar materials because they have relatively poor mechanical properties. A mixture of polyoxyethylene glycol and a polyester has been reacted with a polyisocyanate as a suggested alternative to cure this deficiency. However, the polyester and the polyether must be prepared separately and the resulting plastic still does not have mechanical characteristics suitable for many purposes where a hydrophilic polyurethane foam is desired.

It is therefore an object of this invention to provide a method for making hydrophilic polyurethane foams devoid of the foregoing disadvantages.

It is a further object of this invention to provide an improved method for making hydrophilic polyurethane foams.

Another object of the invention is to provide a method for making a hydrophilic polyurethane foam having good tensile and breaking elongation characteristics.

Still another object of the invention is to provide a novel method for making a polyurethane foam adapted for use as a sponge or a similar water-absorptive article.

The foregoing objects and others are accomplished in accordance with this invention, generally speaking, by providing a method for making a polyurethane foam in which a substantially water-insoluble organic compound having reactive hydrogens is reacted with an organic polyisocyanate in a reaction mixture containing a blowing agent and hydrolyzable esters having the formula $$Me(OR)_n$$

wherein Me is a member selected from the group consisting of

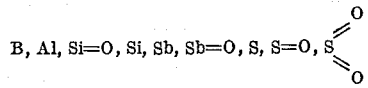

$n$ equals the valence of the Me group and R is the residue remaining after the removal of only one OH group from a polyhydroxy alcohol or a mixture of a polyhydroxy alcohol and a monohydroxy alcohol wherein the ester contains at least one hydroxyl group.

For best results, the reaction mixture should contain from about 3% to about 20% by weight of the hydrolyzable ester based on the weight of the organic compound having reactive hydrogen atoms, but concentrations of from about 1% to about 30% may be used. Quantities below about 1% do not impart sufficient hydrophilic characteristics to the material and quantities above 30% usually interfere with the foaming operation.

Esters which are suitable for inclusion in the reaction mixtures along with the organic compound having reactive hydrogen in accordance with this invention, are those derived from monohydric and/or polyhydric alcohols and the hydrated oxides of boron, aluminum, silicon and antimony or sulfur wherein only one of the hydroxyl groups of the polyhydric alcohol is esterified. Sometimes, especially if the oxides or hydrated oxides are easily available, the ester can be prepared directly from the oxides or hydrated oxides and the hydroxyl-containing alcohol. In other cases it is more convenient to make the esters from derivatives of the oxides such as silicon tetrachloride, boron trichloride, sulfur dichloride, antimony pentachloride, silicon tetraethylate, aluminium ethylate and the like, by reacting the derivatives with the hydroxyl-containing component to split off a hydrogen halide or a lower alcohol. Suitable derivatives are those having as their basic unit residues of boric acid, antimonous acid, antimony acid, silicic acid, their partial dehydration products, aluminium oxide, sulphurous acid, sulphoxylic acid, and the like. The esters may also be made directly from the aforementioned acids although in the case of sulfoxylic acid, a salt such as $Na_2SO_2$ or $NaHSO_2$ must be used. The most preferred esters are the esters of boric acid, aluminum trioxide or orthosilicic acid with polyhydroxy alcohols or mixtures of monohydric and polyhydric alcohols.

If a monohydroxy alcohol is concurrently used in the formation of the ester, it should be preferably either a normal or isoalkanol having from 1 to 10 carbon atoms, such as, for example, allyl alcohol, cyclohexanol, benzyl alcohol and the like. The polyhydroxy alcohol used in the formation of the ester may be any suitable polyhydric alcohol such as, for example, ethylene glycol, diethylene glycol, triethylene glycol, polyethylene glycols, such as triethylene glycol, propylene glycol, polypropylene glycols, such as tripropylene glycol, 1,3-butane diol and 1,4-butane diol, glycerine, butane triol, hexane triol, pentaerythritol, trimethylolethane, trimethylol propane, and the like as well as partial esterification and/or etherification products thereof and mixtures of any of the foregoing with the proviso that the mixture must include at least some polyhydroxy alcohol so that the resulting ester will have some free, i.e., non-esterified hydroxyl groups.

By partial esterification or etherification products of polyhydric alcohols is meant that only one or if the alcohol is of higher functionality that more than one but not all of the hydroxyl groups of the alcohol are esterified or etherified with the metallic moiety of the product $Me(OR)_n$ so that the ester contains at least one free hydroxyl group.

Some specific examples of suitable hydrolyzable esters in accordance with this invention are orthosilicic tetradipropylate, aluminum tris-diglycolate, boric acid bis-(diglycolate)-mono(monomethyletherdiglycolate), boric tris-diglycolate, boric tris-triglycolate, metasilicic bis-diglycolate, antimonic tris-triglycolate, antimonous tris-diglycolate, sulfoxylic acid bis-diglycolate, sulfurous acid bis-triglycolate, sulfuric acid bis-dipropylate.

Any suitable organic compound containing at least two active hydrogen containing groups as determined by the Zerewitinoff method may be used to react with isocyanates in the preparation of a polyurethane. Generally speaking, any compound having an active hydrogen atom which will react with an —NCO group may be used. Hydroxyl groups react with —NCO groups to yield urethane linkages whereas carboxylic acid yield amide groups and amines yield ureas. The alcoholic group is strongly preferred because it is readily available and yields a stronger urethane linkage than a phenolic type hydroxyl group. It is to be understood that active hydrogen containing compounds are contemplated which contain any of the following types of active hydrogen containing groups, among others, —OH, —$NH_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols including alkane, alkene and alkyne diols, triols, tetrols and the like, aliphatic thiols including alkane, alkene and alkyne tiols having two or more —SH groups; polyamines including aromatic, aliphatic and heterocyclic diamines, triamines, tetramines and the like; as well as mixtures thereof. Compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

Any suitable hydroxyl polyester including lactone polyesters may be used, such as, for example, the reaction product of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like, as well as any polyester disclosed in U.S. Reissue 24,514.

Polyalkylene ether polyols prepared by condensation of an alkylene oxide or the like including ethylene oxide, propylene oxide, butylene oxide, styrene oxide, triethylene oxides and the like can be used. Suitable polyalkylene ether polyols are disclosed in U.S. Reissue Patent 24,514. The polymer of tetrahydrofuran is another example of a suitable polyalkylene ether polyol. These polyethylene ether polyols can also be prepared by condensing one of the foregoing oxides with one of the alcohols listed in the foregoing paragraph on the prepartion of polyesters. The alkylene oxide can also be condensed with an amine such as ethylene diamine, toluylene diamine and the like to form a suitable polyether.

Polyalkylene ether thioether polyols such as those disclosed in U.S. Patents 2,844,566, 2,862,972 and 2,900,368 are also suitable for use as the resinous component of this invention. Examples of some such polythioethers are those prepared by condensing thiodiglycol with itself or with ethylene glycol or other non-sulfur containing polyhydric alcohols.

Polyacetals suitable for the purpose of this invention can be prepared by condensing an aldehyde with a polyhydric alcohol. Formaldehyde and ethylene glycol can be condensed to make a suitable polyacetal. Other suitable polyacetals are described in German patent specification 1,039,744.

It is preferred that the organic compound having reactive hydrogens have an acid number of not more than about 15 and an hydroxyl number of not more than about 225. Most often the hydroxyl number will be between about 15 and about 200. Best results are obtained if the organic compound having reactive hydrogens has an hydroxyl number of about 25 to about 100 so this range is most preferred.

Any suitable organic polyisocyanate including those disclosed in U.S. Reissue Patent 24,514 can be used in practicing the invention. Examples of such polyisocyanates are aliphatic, araliphatic or aromatic polyisocyanates including phenylene diisocyanates, 2,4- and/or 2,6-toluylene diisocyanate, diphenylmethane-4,4'-diisocyanate, 4,4'-bisphenylene diisocyanate, 1,5-naphthalene diisocyanate, hexamethylene diisocyanate, decamethylene diisocyanate, ethylene diisocyanate, butylene diisocyanate, dipropyldiisocyanato ether, 2,2-dimethylpentylene diisocyanate, 3-methoxyhexamethylene diisocyanate, 1,4-butylene glycol propylether diisocyanate, undecamethylene diisocyanate, dodecamethylene diisocyanate, 1,3-dimethylbenzene diisocyanate, 1,4-methylbenzene diisocyanate, 1,2-dimethylcyclohexane diisocyanate, 1,4-diethylbenzene diisocyanate, 1,4-dimethylnaphthalene diisocyanate, 1,5-dimethylnaphthalene diisocyanate, biuret triisocyanates, e.g., from 3 mols hexamethylene diisocyanate and 1 mol water, carbodiimides with free terminal NCO groups, e.g., from polyisocyanates with catalysts such as phosphine oxides, dimers having free NCO groups, 1-methylbenzyl-2,4,6-triisocyanate, 1,3,5-trimethylbenzyl-2,4,6-triisocyanate, naphthalene-1,3,7-triisocyanate, 3-methyldiphenylmethane-4,6,4'-triisocyanate, 4,4' - dimethyldiphenylmethane-2,2',5,5'-tetraisocyanate, triphenylmethane - 4,4',4" - triisocyanate and the like. Further addition reaction products of an excess of a polyisocyanate with an alcohol such as trimethylolpropane, glycerol, hexanetriol, a glycol, or a lower molecular weight polyester such as castor oil, or the reaction product of an excess of any suitable isocyanate with an acetal in accordance with German patent specification 1,072,385 or with any of the hereinbefore enumerated active-hydrogen containing compounds may be used as desired, as well as the isocyanates mentioned in German patent specifications 1,022,789 and 1,027,394 as well as in U.S. Reissue Patent 24,514, and U.S. Patent 3,124,635.

Any suitable catalyst including those disclosed in U.S. Reissue Patent 24,514 may be included in the reaction mixture. Examples of suitable catalysts are the tertiary amines including dimethyl benzylamine, dimethyl stearylamine, permethylated diamine, N-methyl-N'-aminoethyl piperazine, endoethylene piperazine, N-ethyl morpholine, N-methyl morpholine, 1-methoxy-3-dimethylaminoethyl piperazine and the like. Salts of such amines with organic acids including oleic acid or benzoic acid can be used. Various types of tin compounds such as dibutyl tin di-2-ethyl hexoate, stannous oleate and the like can be used. Iron acetyl acetonate is also a suitable catalyst.

Sulfonated castor oil or sulfonated ricinoleic acid as well as their salts, and adducts of alkylene oxides with hydrophobic hydroxyl or amine compounds may be used satisfactorily in the reaction mixture as emulsifiers. Other additives which can also be used are, for example, paraffin oils for regulating the pore size, silicon oils as stabilizers, pigments, dyestuffs, flame-proofing agents and the like.

Any material known to be a blowing agent for the preparation of a polyurethane foam may be used in the polyurethane formulation. Water is most often used for this purpose either alone or along with a low boiling organic liquid. Any organic liquid which is inert to the reactants and which has a boiling point corresponding to the reaction temperature may be used for making the foam. Compounds of this type include pentane, hexane, heptane, pentene, heptene and the like; azo compounds such as azohexahydrobenzodinitrile and the like, halogenated hydrocarbons such as dichlorodifluoroethane, dichlorodifluoromethane, trichlorofluoromethane, vinylidene chloride, methylene chloride and the like.

The manipulative steps involved in preparing the polyurethane foam are conventional in most instances in that the organic compound having reactive hydrogen atoms is mixed with an organic polyisocyanate, a catalyst, emulsifier and a blowing agent such as water which will result in gas being present in the mixture. A device of the type disclosed in U.S. Reissue Patent 24,514 can be used in preparing the mixture. It is preferred, however, the hydrolyzable esters, added to the reaction mixture in accordance with this invention, are not mixed with either the polyisocyanate or with water prior to the time of foaming. Preferably, the hydrolyzable ester can either be premixed with the organic compound having reactive hydrogen atoms or it can be added as a separate component to the polyisocyanate and blowing agent simultaneously with the organic compound having reactive hydrogen atoms since the hydrolyzable ester reacts with the polyisocyanate and the water. When mixing all of the components together simultaneously, the hydrolyzable ester is added separately through a mixing nozzle in the mixing apparatus.

Polyurethane foams prepared in accordance with this invention are soft to the touch and have good tensile strength and good elongation as well as the capacity to absorb water. They are particularly useful for making household sponges and for making air filters. The hydrolyzable esters included in the formulation regulate the pore formation of the foam making it possible to prepare polyurethanes having a reproducible porosity. Further, the polyurethane foam prepared by the process of this invention has a substantially open-celled structure which is responsible for its advantageous filtering characteristics.

The invention is further illustrated by the following examples in which all parts and percentages are by weight unless otherwise specified.

Example 1.—Preparation of the boric acid ester

About 210 parts by weight of boric anhydride, about 1272 parts by weight of diethylene glycol and about 804 parts by weight of diethylene glycol monomethyl ether are first of all stirred for about 4 hours at about 100° C. and then, with slowly falling pressure, the water formed in the esterification is distilled off. The esterification is finally completed after a total of about 4 hours at about 100° C. and under a pressure of about 15 mm. Hg and the product, about 2100 parts by weight, is discharged in the absence of moisture. It still contains about 0.86% of water and about 8.8% of OH, determined by reaction with phenyl isocyanate, taking into account the quantity of water.

About 100 parts by weight of polyester prepared from adipic acid, diethylene glycol and trimethylol propane and having an OH number of about 60 are very thoroughly mixed with about 12 parts of the boric acid ester, about 2 parts of dimethyl benzylamine, about 2 parts of a non-ionic emulsifier (oxethylated hydroxy diphenyl), about 2 parts of a 50% aqueous solution of sodium-castor oil sulphate, about 0.3 part of paraffin oil and about 2.5 parts of water. After adding about 50.2 parts of toluylene diisocyanate, a foam material is obtained which shows a water absorptive capacity which is increased fourfold as compared with a foam material produced without any additive.

The water absorption is determined by the following method: a cube with a size of 8 x 8 x 5 cm. is immersed in water, squeezed out, weighed and then laid for 1 minute in a crystallizing dish with about 50 cc. of water. The cube is thereafter weighed again and the percentage increase in weight is established.

Increase in weight becaus of $H_2O$ absorption:

| | Percent |
|---|---|
| Foam material according to Example 1 | 75 |
| Foam material according to Example 1 without additive | 18 |

The foam material has a weight per unit volume of about 41 kg./m.$^3$, a strength of about 1.4 kg./cm.$^2$ and an elongation of about 420%.

Example 2.—Production of the boric acid ester

About 1240 parts by weight of boric acid and about 6360 parts of diethylene glycol are esterified in a manner similar to Example 1 up to a temperature of about 110° C. and a pressure of about 12 mm. Hg, whereupon a colorless ester is obtained with a water content of about 2% and with a yield of about 6590 parts, which uses about 113.6 parts of phenyl isocyanate to about 100 parts of substance.

About 100 parts of the polyester according to Example 1 are thoroughly mixed with about 10 parts of the boric acid ester, about 1.2 parts of dimethyl benzylamine, about 1.5 parts of a non-ionic emulsifier (oxethylated diphenyl), about 1.5 parts of 50% aqueous solution of sodium-castor oil sulphate, about 0.3 part of paraffin oil and about 2.7 parts of water. This mixture is foamed with addition of about 51 parts of toluylene diisocyanate. An increase in weight of about 48% is found when the absorption of water is measured by the method set forth in Example 1.

The foam material has a weight per unit volume of about 38 kg./m.$^3$, a strength of about 1.5 kg./cm.$^2$ and an elongation of about 370%.

Example 3.—Production of the boric acid ester

About 930 parts of boric acid and about 6750 parts of triethylene glycol are esterified in a manner similar to Example 1 up to about 120° C. and about 12 mm. Hg, and there is obtained a yield of about 6900 parts of the colorless polyester, which has a water content of about 0.85% and uses about 112.5 grams of phenyl isocyanate per about 100 grams.

About 100 parts of polyester according to Example 1 are thoroughly mixed with about 12 parts of the boric acid ester, about 1.2 parts of dimethyl benzylamine, about 1.5 parts of a non-ionic emulsifier (oxethylated diphenyl), about 1.5 parts of about 50% aqueous solution of sodium-castor oil sulphate, about 0.3 part by weight of paraffin oil and about 2.7 parts of water. The mixture is foamed with addition of about 49.7 parts of toluylene diisocyanate. The water absorption of the foam material which is obtained is about 53%.

Example 4.—Production of the silicic acid ester

About 268 parts of industrial dipropylene glycol are dehydrated for about 2 hours at about 100° C. and about 12 mm. Hg and thereafter about 104 parts of orthosilicic acid tetraethyl ester are added dropwise in the absence of moisture. The ethyl alcohol formed by the transesterification is removed at about 100° C. and about 12 mm. Hg, and there is obtained a yield of about 307 parts of the colorless orthosilicic tetradipropylate, which shows a hydroxyl content of about 9.5% with respect to phenyl isocyanate.

About 100 parts of a polypropylene glycol with an OH number of about 56 and slightly branched with trimethylol propane are mixed well with about 10 parts by weight of the silicic acid ester, about 0.15 part of triethylene diamine, about 1.5 parts of polysiloxane-polyalkylene glycol copolymer and about 2.9 parts of water. The mixture is foamed with about 47.2 parts of toluylene diisocyanate. In this way, there is obtained a soft foam material which has a water absorption of about 63%.

Example 5.—Production of the aluminium ester

About 159 parts of diethylene glycol are initially dehydrated at about 80° C. and about 12 mm. Hg for about 2 hours and about 123 parts of aluminium sec. butylate are then added dropwise in the absence of moisture at the same temperature. The butanol is removed at about 120°/12 mm. Hg and there is obtained a yield of about 180 parts of the aluminium tris-diglycolate with about 14.9% of OH.

About 100 parts of the polyester according to Example 1 are mixed with about 5 parts of the aluminium ester, about 2 parts of dimethyl benzylamine, about 1 part of a non-ionic emulsifier (oxethylated diphenyl), about 2 parts of about 50% aqueous solution of sodium-castor oil sulphate, about 0.3 part of paraffin oil and about 2.5 parts of water. The mixture obtained is foamed with addition of about 51 parts of toluylene diisocyanate. The foam material has a water absorption of about 41%.

It is to be understood that any of the other compounds having reactive hydrogens, any other organic polyisocyanate and/or any other hydrolyzable ester indicated as suitable herein can be substituted for those used in the foregoing examples.

Although the invention has been described in considerable detail in the foregoing, it is to be understood that such detail is solely for the purpose of illustration and that variations may be made by those skilled in the art without departing from the spirit and scope of the invention except as set forth in the claims.

What is claimed is:
1. A method for making a polyurethane foam which comprises reacting in a reaction mixture containing a blowing agent an organic polyisocyanate with an organic compound having reactive hydrogen atoms determinable by the Zerewitinoff method, a molecular weight of at least about 500, an acid number of not more than about 15 and a hydroxyl number of not more than about 225, and from about 1% to about 30% of a hydrolyzable ester having the formula

$$Me(OR)_n$$

wherein Me is a member selected from the group consisting of B, Al, and Si, $n$ equals the valence of the Me group and R is the residue remaining after the removal of only one OH group from a member selected from the group consisting of polyhydroxy alcohols and mixtures of polyhydroxy and monohydroxy alcohols, said ester containing at least one hydroxyl group.

2. The method of claim 1 wherein the monohydroxy alcohols are alkanols and the polyhydroxy alcohols are polyhydric alcohols and the partial esterification or etherification products thereof.

3. The process of claim 1 wherein the group member is B.

4. The process of claim 1 wherein the group member is Al.

5. The process of claim 1 wherein the group member is Si.

6. A hydrophilic polyurethane sponge which has been prepared by reacting an organic polyisocyanate with both an organic compound having reactive hydrogen atoms as determinable by the Zerewitinoff method, a molecular weight of at least about 500, an acid number of not more than about 15 and a hydroxyl number of not more than about 225, and from about 1% to about 30% by weight based on the weight of said organic compound having reactive hydrogen atoms of a hydrolyzable ester having the formula $$Me(OR)_n$$

wherein Me is a member selected from the group consisting of B, Al, and Si; $n$ equals the valence of the Me group, and R is the residue remaining after the removal of only one OH group from a member selected from the group consisting of a polyhydroxy alcohol and mixtures of polyhydroxy and monohydroxy alcohols, said ester containing at least one hydroxyl group, in a reaction mixture containing a blowing agent.

References Cited

UNITED STATES PATENTS

| | | | |
|---|---|---|---|
| 3,109,853 | 11/1963 | Worsley et al. | 260—2.5 |
| 3,134,742 | 5/1964 | Wismer et al. | 260—2.5 |

OTHER REFERENCES

Eaborn: "Organosilicon Compound," p. 113, copyright 1960, Academic Press Inc., New York.

Moller: "Inorganic Chemistry," pp. 533, 534, 535, copyright 1952, John Wiley and Sons, New York.

DONALD E. CZAJA, Primary Examiner.

H. S. COCKERAM, Assistant Examiner.